United States Patent [19]
Yamamoto

[11] Patent Number: 5,474,752
[45] Date of Patent: Dec. 12, 1995

[54] METHOD OF PRODUCING ACTIVE CATHODE MATERIAL FOR LITHIUM SECONDARY BATTERY

[75] Inventor: Yoshikatsu Yamamoto, Fukushima, Japan

[73] Assignee: Sony Corporation, Tokyo, Japan

[21] Appl. No.: 327,719

[22] Filed: Oct. 24, 1994

[30] Foreign Application Priority Data

Oct. 29, 1993 [JP] Japan .................................. 5-272847

[51] Int. Cl.$^6$ .................................................. C01G 37/14
[52] U.S. Cl. ........................ 423/596; 423/593; 423/594
[58] Field of Search ................................... 423/593, 594, 423/596

[56] References Cited

U.S. PATENT DOCUMENTS

| | | | |
|---|---|---|---|
| 5,180,574 | 1/1993 | Von Sacken | 423/594 |
| 5,264,201 | 11/1993 | Dahn et al. | 423/596 |
| 5,370,948 | 12/1994 | Hasegawa et al. | 423/594 |

FOREIGN PATENT DOCUMENTS

| | | |
|---|---|---|
| 0391281A2 | 10/1990 | European Pat. Off. . |
| 391281A3 | 10/1990 | European Pat. Off. . |
| 468942 | 1/1992 | European Pat. Off. . |

*Primary Examiner*—Bruce F. Bell
*Attorney, Agent, or Firm*—Hill, Steadman & Simpson

[57] ABSTRACT

A method of producing active cathode material for lithium secondary battery is provided. In accordance with this invention, a mixture of a lithium salt and a transition metal salt is baked in oxygen atmosphere, wherein the oxygen pressure during baking is about 147.1 kPa or more. The lithium transition metal compound oxides prepared have the composition, $Li_xNi_yM_{1-y}O_2$, wherein M is one kind of transition metal or more, and x and y respectively have the values $0.05 \leq x \leq 1.10$ and $0.5 \leq y \leq 1.0$. The active cathode material for a lithium secondary battery according to this invention, provides lithium transition metal compound oxides which are uniform in composition and characteristic, and exhibit excellent functioning as an active cathode material. Lithium secondary batteries produced therewith exhibit excellent cycle characteristics, high energy densities and low material costs, are of uniform quality and exhibit no unevenness of battery capacity.

2 Claims, 2 Drawing Sheets

METHOD OF PRODUCING ACTIVE CATHODE MATERIAL FOR LITHIUM SECONDARY BATTERY

BACKGROUND OF THE INVENTION

The present invention relates to a method of producing active cathode material for lithium secondary battery having the composition, $Li_xNi_yM_{1-y}O_2$.

In recent years, with the progress of the electronic technology, high performance, compact and portable electronic equipment is now available. Secondary batteries used in this modern, compact, portable high performance electronic equipment are required to have high energy density.

Previously, nickel cadmium batteries and lead batteries were employed as the secondary batteries used in these kinds of modern electronic equipment. These batteries have a relatively low discharge potential, however, and therefore are insufficient in providing required high energy density characteristics.

Recently, research and development efforts have lead to the development of lithium secondary batteries in which a material capable of doping and de-doping lithium ion, such as, for example, lithium, lithium alloy or carbon material is used as active anode material. Lithium compound oxides, such as, for example, lithium cobalt compound oxide, lithium nickel compound oxide or lithium nickel cobalt compound oxide, etc. are used as active cathode material. A lithium electrolyte, such as $LiClO_4$, dissolved in a non-aqueous solvent is used as the electrolytic solution.

This modern type of lithium secondary battery has high battery voltage, high energy density, less self-discharge, and excellent cycling characteristics. It has been confirmed that, among the above-mentioned materials, employment of lithium nickel compound oxide ($LiNiO_2$) as the cathode provides higher energy as compared to employment of lithium cobalt compound oxide ($LiCoO_2$) as indicated by U.S. Pat. Nos. 4,302,518, 4,357,215 and 4,980,080. In addition, nickel is more abundant than cobalt as a raw material and is therefore inexpensive. Accordingly, development of a lithium secondary battery using lithium nickel compound oxide or lithium nickel cobalt compound oxide including higher percentages of a nickel component than a cobalt component provides cost-savings advantages.

However, in lithium secondary batteries using lithium nickel compound oxide or lithium nickel cobalt compound oxide including high composition ratio of the nickel component, there is a tendency for battery capacity to exhibit undesirable unevenness, such that these kinds of secondary batteries disadvantageously fail to maintain prescribed levels of quality.

It is believed that the reason why the uneven capacity problem occurs is that in lithium nickel compound oxide or lithium nickel cobalt compound oxide including high composition ratios of a nickel component, the exact composition of the compound oxides varies, dependent upon the synthetic conditions present at the synthetic stage and accordingly, it is difficult to obtain lithium secondary batteries having uniform capacity characteristics. In order to provide lithium secondary batteries having higher energy and wherein unevenness of battery capacity is suppressed, it is indispensable to develop a new and improved method for making lithium nickel compound oxides or lithium nickel cobalt compounds including a high composition ratio of nickel component having a substantially uniform composition.

SUMMARY OF THE INVENTION

Accordingly, to overcome the disadvantages of the prior art materials and methods, it is an object of the present invention to provide a method of producing an active cathode material for a lithium secondary battery having a substantially uniform chemical composition capable of performing the functions of a high-quality cathode material.

To achieve the above-mentioned object, in accordance with this invention, there is provided a method of producing active cathode material for lithium secondary battery comprising the steps of forming a mixture of a lithium salt and a transition metal salt; and baking the mixture under an oxygen atmosphere at an oxygen pressure of 147.1 kPa or more to provide a lithium transition metal compound oxide composition having the formula: of $Li_xNi_yM_{1-y}O_2$ wherein M is one or more transition metals and x and y have values such that $0.05 \leq x \leq 1.10$ and $0.5 \leq y \leq 1.0$).

The preferred lithium transition metal compound oxide is a composition of the formula $Li_xNi_yCo_{1-y}O_2$ wherein the values of x and y are respectively expressed as $0.05 \leq x \leq 1.10$, $0.5 \leq y \leq 1.0$.

DETAILED DESCRIPTION OF THE INVENTION

Figure 1:
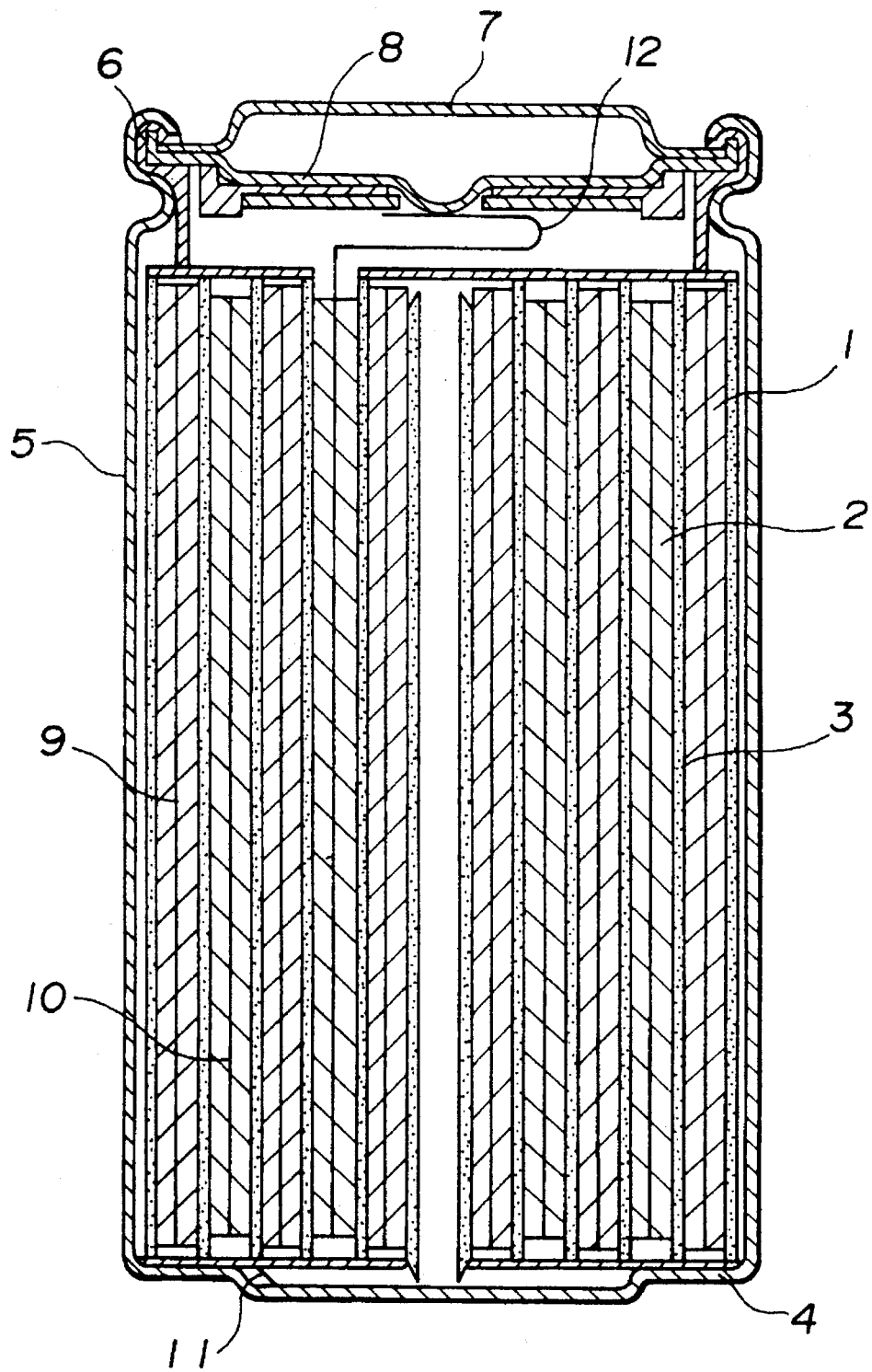
FIG. 1 is a schematic longitudinal cross sectional view showing the configuration of a lithium secondary battery to which active cathode material manufactured by a manufacturing method of this invention is applied.

A lithium transition metal compound oxide composition in accordance with the present invention is synthesized by baking, under oxygen atmosphere, mixture of lithium salt, nickel salt and transition metal salt corresponding to M in the composition formula.

In accordance with this invention, in order to obtain an active cathode material having a uniform composition and characteristics, when making the lithium transition metal compound oxide, the oxygen pressure of the oxygen atmosphere is set to 147.1 kPa (1.5 kg/cm²) or more during the baking process to carry out baking under pressurized oxygen atmosphere. The reason why an improved lithium transition metal compound oxide having uniform composition and characteristics is obtained by carrying out baking under pressurized oxygen atmosphere is set forth hereinafter.

In order to bake a mixture of a lithium salt and a transition metal salt under oxygen atmosphere to synthesize the lithium transition metal compound oxide, it is required that the transition metal be sufficiently oxidized in baking so that it becomes trivalent. However, among transition metals, it is generally more difficult to make nickel in a trivalent oxidation state as compared to other transition metals such as cobalt, etc. For this reason, in the case of attempting to synthesize lithium transition metal compound oxide having higher Ni composition ratio of 0.5–1.0 as indicated by the above-mentioned compositional formula, a large quantity of Ni would participate in the oxidation reaction. Accordingly, it is difficult to obtain the desired degree of oxidation in a oxygen atmosphere at ordinary oxygen pressure. The resulting unevenness in capacity of the material is caused by variations the oxidation state of the nickel present in the lithium transition metal compound oxide.

In accordance with the present invention, when the oxygen pressure in the oxygen atmosphere in baking is increased to 147.1 kPa or more, oxidation of nickel is promoted. Thus, nickel easily becomes trivalent. Accordingly, the reaction proceeds smoothly. The new and improved lithium transition metal oxides having high Ni composition ratios as defined by the above-mentioned compositional formula may now be synthesized having uniform characteristics.

It should be noted that it is not required that oxygen pressure of 147.1 kPa or more be maintained over the entire baking process, but if oxygen pressure is 147.1 kPa or more during at least a portion of the baking time period, a lithium transition metal oxide having sufficiently uniform characteristics can be obtained.

It should be noted that it is not preferred to allow the oxygen pressure in baking atmosphere to be much higher than 147.1 kPa and it is desirable to hold that oxygen pressure to less than 980.6 kPa (10 kg/cm$_2$). The reason why oxygen pressure in such a range is employed is that at these oxygen pressures the atmosphere is already saturated in the vicinity of 980.6 kPa of oxygen pressure. Even if oxygen pressure is elevated to more than that value, further improvement in uniformness of characteristics cannot be made. Expensive synthesizing systems are required for allowing oxygen pressure to be 980.6 kPa or more, resulting in increased manufacturing cost, which are unnecessary.

In accordance with the method of this invention, a lithium salt, nickel salt and transition metal salt corresponding to M are baked under pressurized oxygen atmosphere in a manner stated above. Any salt ordinarily used as the starting material in synthesis of lithium transition metal compound oxides, may be used. Moreover, as the transition metal M, it is desirable to select cobalt. A compound oxide having the formula $Li_xNi_xCo_{1-y}O_2$ greatly contributes to realization of a battery having large capacity as compared to $Li_xNi_yM_{1-y}O_2$ where M is transition metal other than cobalt.

In order to prepare the cathode by using, as the active cathode material, lithium transition metal compound oxide synthesized in accordance with the present invention, it is sufficient to mix the lithium transition metal compound oxide together with conductive material or binder to prepare a cathode depolarizing mixture and thereafter to coat the cathode depolarizing mixture onto a cathode collector. The cathode prepared in this manner exhibits excellent performance as the cathode without causing unevenness of battery capacity because the active cathode material is excellent in terms of its uniformity of composition and characteristics.

In accordance with this invention an improved lithium secondary battery additionally comprises an anode and a non-aqueous electrolyte together with the new and improved cathode prepared with the lithium transition metal compound oxide as active cathode material.

More particularly, as the anode, there can be used any material capable of doping/undoping lithium ion, e.g., thermally decomposed carbon, coke (pitch coke, needle coke, petroleum coke, etc.), graphite, carbon in the form of glass, organic high molecular compound baked members, such as material obtained by baking phenol resins or furan resins, at a suitable temperature to carbonize it, carbon fiber, carbonaceous material such as activated carbon, etc., metallic lithium, and lithium alloy. In addition, polymer materials such as polyacetylene, polypyrrole, etc. can be used.

Preferred materials for use as the anode comprise carbonaceous materials in which spacing of (002) plane is 0.370 nm or more, having a true density of less than 1.70 g/cm$^3$, and which do not exhibit an exothermic peak at 700° C. or more, as measured by differential thermal analysis in air flow.

As the non-aqueous electrolytic solution, there may be used electrolytic solutions in which an electrolyte, such as a lithium salt, is dissolved in an organic solvent. As the organic solvent, although specifically limited, there may be used, e.g., a solvent consisting of propylene carbonate, ethylene carbonate, 1,2-dimethoxy ethane, y-butyrolactone, tetrahydrofuran, 2-methyl-tetrahydrofuran, 1,3-dioxysolan, sulforan, acetonitrile, dimethyl carbonate, diethyl carbonate, or dipropyl carbonate etc., or a mixed solvent including two kinds of the above solvent materials or more.

As the electrolyte, $LiClO_4$, $LiAsF_6$, $LiPF_6$, $LiBF_4$, $LiB(C_6H_5)_4$, $LiC$, $LiBr$, $CH_3SO_3Li$, $CF_3SO_3Li$, etc. may be used.

When a mixture of lithium salt and transition metal salt is baked under oxygen atmosphere in synthesizing lithium transition metal compound oxide having a composition of the formula $Li_xNi_yM_{1-y}O_2$ wherein M is at least one transition metal, and x, y are respectively expressed as $0.05 \leq x \leq 1.10$, $0.5 \leq y \leq 1.0$, oxygen pressure in the atmosphere in baking is set to 147.1 kPa or more during at least a portion of the baking process so that the synthetic reaction smoothly proceeds and a lithium transition metal compound oxide of the above-mentioned composition is synthesized having uniform composition and performance characteristics.

Accordingly, when a cathode is prepared using the new and improved lithium transition metal compound oxide synthesized in this way as active cathode material, a lithium secondary battery of uniform quality, having no unevenness in battery capacity is realized.

DESCRIPTION OF THE PREFERRED EMBODIMENTS

Preferred embodiments of this invention will now be described.

EXAMPLE 1

Lithium hydroxide and nickel oxide were mixed to provide a mixture having an Li:Ni (mol ratio)=1.0:1.0. Then, this mixture was baked for 12 hours at temperature of 800° C. under pressurized oxygen atmosphere of oxygen pressure of 147.1 kPa (1.5 Kg/cm$^2$) to synthesize a lithium transition metal compound oxide.

EXAMPLE 2–EXAMPLE 6

The following active cathode materials were prepared in accordance with the method of Example 1 except that the oxygen pressure in the oxygen atmosphere during baking is changed as indicated by Table 1, to produce the desired lithium transition metal compound oxide materials.

EXAMPLE 7

A mixture of lithium hydroxide and nickel oxide was prepared having an Li:Ni (mol ratio)=1.0:1.0. Then, this mixture was baked for 6 hours at temperature of 800° C. under pressurized oxygen atmosphere of oxygen pressure of 98.1 kPa (1 Kg/cm$^2$) and thereafter baked for 6 hours at temperature of 800° C. with the oxygen pressure at 490.3 kPa (5 Kg/cm$^2$), thus to synthesize the desired lithium transition metal compound oxide.

EXAMPLE 8

A mixture of lithium hydroxide, nickel oxide and cobalt oxide was prepared having an Li:Ni:Co ratio (mol ratio)= 1.0:0.5:0.5. The mixture was baked for 6 hours at a temperature of 800° C. under pressurized oxygen atmosphere of oxygen pressure of 490.3 kPa, to synthesize the corresponding lithium transition metal compound oxide.

Comparative Example A

A mixture of lithium hydroxide and nickel oxide was prepared having an Li:Ni (mol ratio)=1.0:1.0. The mixture was baked for 12 hours at temperature of 800° C. under pressurized oxygen atmosphere of oxygen pressure of 98.1 kPa (1 Kg/cm$^2$), to synthesize a lithium transition metal compound oxide.

Comparative Example B

A mixture of lithium hydroxide and nickel oxide was prepared having an Li:Ni (mol ratio)=1.0:1.0. Thereafter, the mixture was baked for 12 hours at temperature of 800° C. under pressurized oxygen atmosphere of oxygen pressure of 117.7 kPa (1.2 Kg/cm$^2$), to synthesize lithium transition metal compound oxide.

Comparative Example C

A mixture of lithium hydroxide, nickel oxide and cobalt oxide was prepared having an Li:Ni:Co ratio (mol ratio)= 1.0:0.4:0.6. Thereafter, the mixture was baked for 12 hours at a temperature of 800° C. under pressurized oxygen atmosphere of oxygen pressure of 98.1 kPa (1 kg/m$^2$), to synthesize lithium transition metal compound oxide.

Comparative Example D

A mixture of lithium hydroxide, nickel oxide and cobalt oxide was prepared having an Li:Ni:Co ratio (mol ratio)= 1.0:0.4:0.6. Thereafter, the mixture was baked for 12 hours at a temperature of 800° C. under a pressurized oxygen atmosphere of oxygen pressure of 490.3 kPa (5 kg/cm$^2$), to synthesize lithium transition metal compound oxide.

Comparative Example E

A mixture of lithium hydroxide, nickel oxide and cobalt oxide was prepared having an Li:Ni:Co ratio (mol ratio)= 1.0:0.5:0.5. Thereafter, the mixture was baked for 12 hours at a temperature of 800° C. under pressurized oxygen atmosphere of oxygen pressure of 98.1 kPa (1 kg/cm$^2$), to synthesize lithium transition metal compound oxide.

The respective ratios of Li:Ni:Co of the starting material and the oxygen pressures during baking in the Examples 1~8 and the comparative Examples A~E are shown in Table 1 as follows:

TABLE 1

| | Li:Ni:Co RATIO | OXYGEN PRESSURE |
|---|---|---|
| EMBODIMENT 1 | 1:1:0 | 147.1 kPa |
| EMBODIMENT 2 | 1:1:0 | 196.1 kPa |
| EMBODIMENT 3 | 1:1:0 | 294.2 kPa |
| EMBODIMENT 4 | 1:1:0 | 490.3 kPa |
| EMBODIMENT 5 | 1:1:0 | 686.4 kPa |
| EMBODIMENT 6 | 1:1:0 | 970.8 kPa |
| EMBODIMENT 7 | 1:1:0 | 98.1 kPa→490.3 kPa |
| EMBODIMENT 8 | 1:0.5:0.5 | 490.3 kPa |
| COMPARATIVE EXAMPLE 1 | 1:1:0 | 98.1 kPa |
| COMPARATIVE EXAMPLE 2 | 1:1:0 | 117.7 kPa |
| COMPARATIVE EXAMPLE 3 | 1:0.4:0.6 | 98.1 kPa |
| COMPARATIVE EXAMPLE 4 | 1:0.4:0.6 | 490.3 kPa |
| COMPARATIVE EXAMPLE 5 | 1:0.5:0.5 | 98.1 kPa |

The lithium transition metal compound oxides prepared above were analyzed by x-ray diffraction measurements.

The x-ray diffraction spectra obtained for the compound oxides of Examples 1–7 and A–B were consistent with a lithium transition metal compound oxide having a composition of LiNiO$_2$. On the other hand, the x-ray diffraction spectra obtained from the compound oxides prepared in Examples 8 and C–E showed diffraction patterns extremely similar to the case of LiNiO$_2$, although the diffraction position and diffraction intensity were different, suggesting that a different spacing was obtained. From these facts, it was concluded that replacement of a portion of the nickel in the LiNiO$_2$ oxide with cobalt occurred.

The methods of Examples 1–8 and A–E were repeated five times each to provide a series of lithium transition metal compound oxide samples.

The lithium transition metal compound oxide samples obtained were employed as the active cathode material to prepare a cylindrical lithium secondary battery as shown in FIG. 1.

Initially, a belt shaped cathode was made up.

A cathode depolarizing mix was prepared for each sample by mixing of 91% by weight, 6% by weight synthesized lithium transition metal compound oxide graphite serving as conductive material, and of 3% by weight polyvinylidene fluoride serving as binder to prepare a cathode depolarizing mix. This cathode depolarizing mix was dispersed into N-methyl-2-pyrrolidone to provide a cathode depolarizing mix slurry. This cathode depolarizing mix slurry was coated on the both surfaces of belt-shaped aluminum foil serving as cathode collector 10 and permitted to dry. Thereafter, the coated belt was compression-molded by using a roller press machine to prepare cathode 2.

Thereafter, a belt shaped anode was made up in accordance with the following method.

Petroleum pitch was used as the starting material. A functional group including oxygen was introduced into petroleum pitch (oxygen bridging). The petroleum pitch into which functional group including oxygen was introduced was baked at temperature of 1000° C. in the atmosphere of inactive gas to obtain graphitization. A resistive carbon material having property similar to carbon in the form of glass was obtained. When x-ray diffraction measurements were conducted with respect to the graphitization resistive carbon material, a spacing of (002) plane was 0.376 nm, and true density of 1.58/cm$^3$ was observed. The carbon material obtained in this way was used as the active anode material by mixing 90% by weight of the carbon material and 10% by weight of polyvinylidene fluoride serving as binder to prepare anode depolarizing mix. This anode depolarizing mix is dispersed into N-methyl-2-pyrrolidone to provide an anode depolarizing mix slurry. This anode depolarizing mix slurry was coated on the both surfaces of belt shaped copper foil serving as anode collector 9 and permitted to dry. Thereafter, the coated foil belt was subjected to compression-molding using a roller press machine to prepare anode 1.

Cathodes 2 and anodes 1 prepared above are stacked in order and separated by a separator 3 comprised of a microporous polypropylene film having thickness of 25 μm. Thereafter, the layered structure is wound a number of times in a spiral form to thereby prepare an electrode winding body.

Then, a nickel plated steel insulating plate 4 is inserted into the bottom portion of battery can 5 to accommodate the electrode winding body thereinto. For the purpose of collecting electricity of the anode, one end of a nickel anode lead 11 is pressure-connected to anode 2, and the other end thereof is welded to the battery can 5. In addition, in order to collect electricity of the cathode, one end of an aluminum cathode lead 12 is attached to cathode 1, and the other end is welded to battery cover 7 having current interrupting mechanism.

Then, electrolytic solution comprising $LiPF_6$ dissolved in a mixed solvent of propylene carbonate/diethyl carbonate, 50%/50% V/V at a rate of 1 mol, is poured into the battery can 5. Then, the battery can 5 is caulked through an asphalt coated insulating sealing gasket to thereby fix battery cover 7 to provide ten cylindrical batteries in total having diameter of 20 mm and height of 50 mm.

The batteries were charged under the conditions of upper limit voltage of 4.2 V (volts) and current of 1A (amperes). Thereafter, battery capacity measurements were taken by constant current discharge conducted under the conditions of a current of 0.5 A and a discharge final voltage of 2.75 V.

The battery capacity (mean value of ten batteries) and the degree of unevenness of battery capacity results obtained are shown in Table 2.

TABLE 2A

|  | BATTERY CAPACITY (mAh) | | | | | UNEVENNESS R |
|---|---|---|---|---|---|---|
|  | SYNTHESIS 1 | SYNTHESIS 2 | SYNTHESIS 3 | SYNTHESIS 4 | SYNTHESIS 5 | (MAX − MIN.) |
| EMBODIMENT 1 | 1012 | 1004 | 996 | 990 | 1003 | 22 |
| EMBODIMENT 2 | 1003 | 1011 | 992 | 1003 | 1011 | 19 |
| EMBODIMENT 3 | 997 | 1008 | 990 | 1005 | 1000 | 18 |
| EMBODIMENT 4 | 1005 | 993 | 989 | 1008 | 997 | 19 |

TABLE 2B

|  | BATTERY CAPACITY (mAh) | | | | | UNEVENNESS R |
|---|---|---|---|---|---|---|
|  | SYNTHESIS 1 | SYNTHESIS 2 | SYNTHESIS 3 | SYNTHESIS 4 | SYNTHESIS 5 | (MAX − MIN.) |
| EMBODIMENT 5 | 1012 | 995 | 998 | 1001 | 998 | 17 |
| EMBODIMENT 6 | 1006 | 1002 | 999 | 1009 | 992 | 17 |
| EMBODIMENT 7 | 1004 | 1012 | 995 | 993 | 1001 | 19 |
| EMBODIMENT 8 | 987 | 991 | 999 | 981 | 979 | 20 |

TABLE 2C

|  | BATTERY CAPACITY (mAh) | | | | | UNEVENNESS R |
|---|---|---|---|---|---|---|
|  | SYNTHESIS 1 | SYNTHESIS 2 | SYNTHESIS 3 | SYNTHESIS 4 | SYNTHESIS 5 | (MAX − MIN.) |
| COMPAR- | 975 | 1005 | 958 | 994 | 981 | 47 |

TABLE 2C-continued

| | BATTERY CAPACITY (mAh) | | | | | UNEVENNESS R |
|---|---|---|---|---|---|---|
| | SYNTHE-SIS 1 | SYNTHE-SIS 2 | SYNTHE-SIS 3 | SYNTHE-SIS 4 | SYNTHE-SIS 5 | (MAX – MIN.) |
| ATIVE EXAMPLE 1 | | | | | | |
| COMPARATIVE EXAMPLE 2 | 1006 | 973 | 983 | 995 | 969 | 37 |
| COMPARATIVE EXAMPLE 3 | 982 | 1003 | 996 | 988 | 988 | 21 |
| COMPARATIVE EXAMPLE 4 | 1001 | 980 | 994 | 996 | 991 | 21 |
| COMPARATIVE EXAMPLE 5 | 952 | 989 | 967 | 993 | 961 | 41 |

Figure 2:
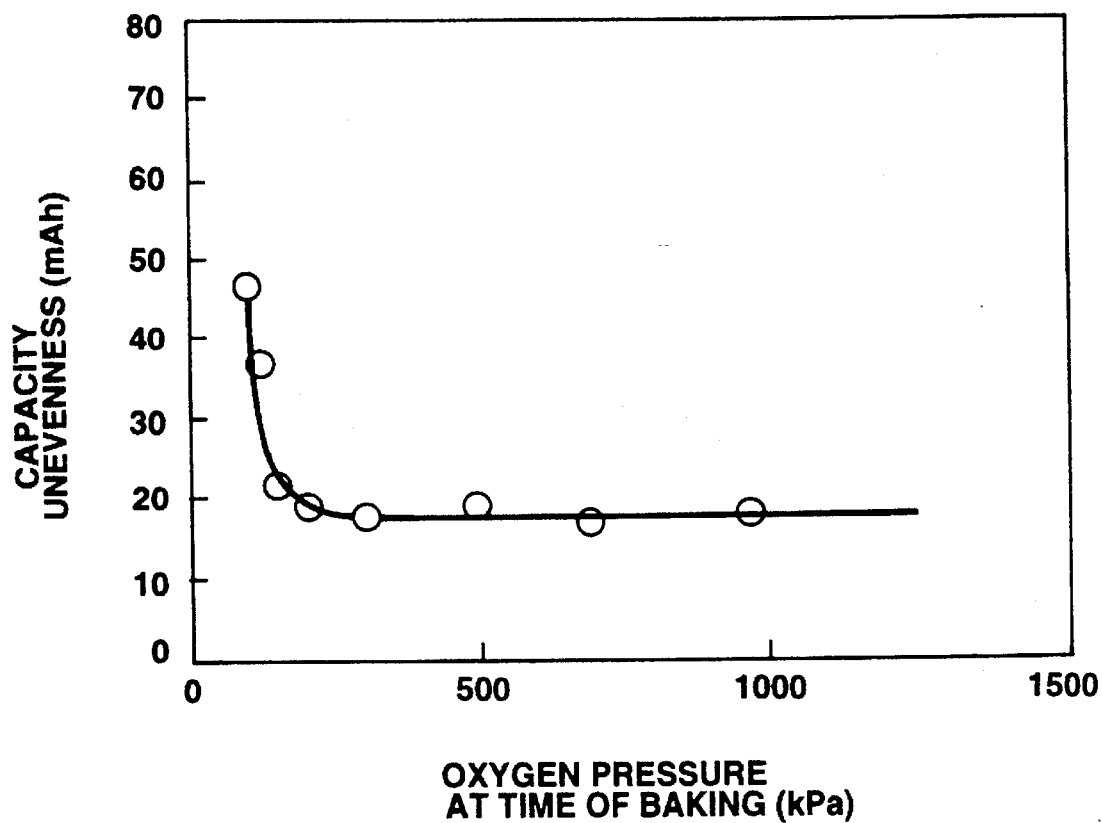
FIG. 2 is a graph showing the relationship between oxygen pressure in the atmosphere in baking and degree of unevenness of battery capacity.

The results obtained with the materials of Examples 1–6 and A–B, each having the same Li:Ni:CO ratios but prepared under different baking conditions is shown in FIG. 2.

As shown in FIG. 2, the degree of unevenness of battery capacity varies depending upon the oxygen pressure at the time of baking. For Examples A–B in which the oxygen pressure was less than 147.1 kPa, measured capacity was not uniform. However, as the oxygen pressure becomes large, the degree of unevenness of battery capacity becomes small. In the range where oxygen pressure is 147.1 kPa or more, it maintains lower value of about 20, and does not change so as to take a value lower than that.

From the above fact, it has been found that setting oxygen pressure to 147.1 kPa or more in baking lithium salt and transition metal salt under oxygen atmosphere is effective in reducing unevenness of battery capacity of the battery.

It should be noted that while, in the embodiment 7, in baking, oxygen pressure is set to lower value of 98.1 kPa in the beginning and is set to higher value of 490.3 kPa from the middle, the degree of unevenness of battery capacity takes a lower value of 20 similarly to other embodiments. From this fact, it has been found that it is not required that oxygen pressure is set to 147.1 kPa or more over the entirety of baking process, it is sufficient that oxygen pressure is set to 147.1 kPa or more during at least a portion of baking time.

As is clear from the foregoing description, in accordance with this invention, a mixture of lithium salt and transition metal salt baked under oxygen atmosphere at an oxygen pressure in the atmosphere during baking of 147.1 kPa or more during the baking process provides a lithium transition metal compound oxide having a composition of $Li_xNi_yM_{1-y}O_2$, wherein M is one kind of transition metal or more, and x and y have values such that $0.05<x<1.10$, $0.5<y<1.0$). Accordingly, it is now possible to obtain lithium transition metal compound oxide having uniform composition and characteristics which exhibit excellent functioning as the active cathode material for use in lithium secondary batteries.

Lithium secondary batteries prepared in accordance with the present invention exhibit excellent cycle characteristics, high energy density, low material cost, uniform quality, and do not exhibit unevenness of battery capacity.

What is claimed is:

1. A method for making an active cathode material for a lithium secondary battery comprising the steps of:

forming a mixture of a lithium salt, a nickel salt and optionally a cobalt salt; and baking the mixture under an oxygen atmosphere at an oxygen pressure of 147.1 kPa or more during at least a portion of the baking step to provide a lithium transition metal compound oxide having the formula $Li_xNi_yCo_{1-y}O_2$ wherein x and y have a value such that $0.05 \leq x \leq 1.10$ and $0.5 \leq y \leq 1.0$, respectively.

2. A method of producing an active cathode material for a lithium secondary battery as set forth in claim 1, wherein the oxygen pressure in the atmosphere during baking is between about 147.1 kPa to about 980.6 kPa.

* * * * *